(12) United States Patent
Haramburu et al.

(10) Patent No.: US 10,753,314 B2
(45) Date of Patent: Aug. 25, 2020

(54) TURBOJET ENGINE NACELLE COMPRISING A THRUST REVERSER DRIVE MECHANISM

(71) Applicants: Airbus Operations (S.A.S.), Toulouse (FR); Airbus (S.A.S.)

(72) Inventors: Eric Haramburu, Colomiers (FR); Patrick Oberle, Verdun sur Garonne (FR); Eric Masson, Blagnac (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 261 days.

(21) Appl. No.: 15/889,778

(22) Filed: Feb. 6, 2018

(65) Prior Publication Data

US 2018/0230939 A1    Aug. 16, 2018

(30) Foreign Application Priority Data

Feb. 7, 2017    (FR) ...................................... 17 51003

(51) Int. Cl.
*F02K 1/70* (2006.01)
*F02K 1/72* (2006.01)
(Continued)

(52) U.S. Cl.
CPC ............... *F02K 1/70* (2013.01); *B64D 27/18* (2013.01); *B64D 29/06* (2013.01); *F02K 1/72* (2013.01); *F05D 2220/323* (2013.01)

(58) Field of Classification Search
CPC ..... F02K 1/70; F02K 1/72; F02K 1/76; F02K 1/763; F02K 1/60; F02K 1/605; F02K 1/62; F02K 1/625
See application file for complete search history.

(56) References Cited

U.S. PATENT DOCUMENTS

| 3,814,324 | A | * | 6/1974 | Wanger | ................. | F02K 1/12 |
| | | | | | | 239/265.31 |
| 4,909,442 | A | * | 3/1990 | Fernz | .................. | F02K 1/72 |
| | | | | | | 239/265.29 |
| 5,309,711 | A | * | 5/1994 | Matthias | .............. | F02K 1/72 |
| | | | | | | 239/265.29 |

FOREIGN PATENT DOCUMENTS

EP    3034848 A1    6/2016
FR    2929998 A1    10/2009
(Continued)

OTHER PUBLICATIONS

French Search Report for French Application No. 1751003 dated Sep. 15, 2017.

*Primary Examiner* — Andrew H Nguyen
(74) *Attorney, Agent, or Firm* — Jenkins, Wilson, Taylor & Hunt, P.A.

(57) ABSTRACT

A nacelle includes a fixed structure supporting a fixed cowl and a movable cowl, the movable cowl being movable translationally between a closing position and an opening position. A blocker door is movably mounted rotationally on the nacelle between a closed position and an open position. The nacelle includes a drive mechanism of the blocker door and of the movable cowl between the closed/closing position and the open/opening position of the blocker door/movable cowl, respectively, and vice versa, the drive mechanism includes at least one actuator fixed, to the fixed structure of the nacelle and, to a fitting fixed to the movable cowl. The drive mechanism includes, for each actuator, a flexible member having a first end fixed to the fixed structure of the nacelle and a second end fixed to the fitting.

7 Claims, 6 Drawing Sheets

(51) Int. Cl.
*B64D 29/06* (2006.01)
*B64D 27/18* (2006.01)

(56) References Cited

FOREIGN PATENT DOCUMENTS

FR 3006716 A1 12/2014
WO WO 2016/059331 A1 4/2016

* cited by examiner

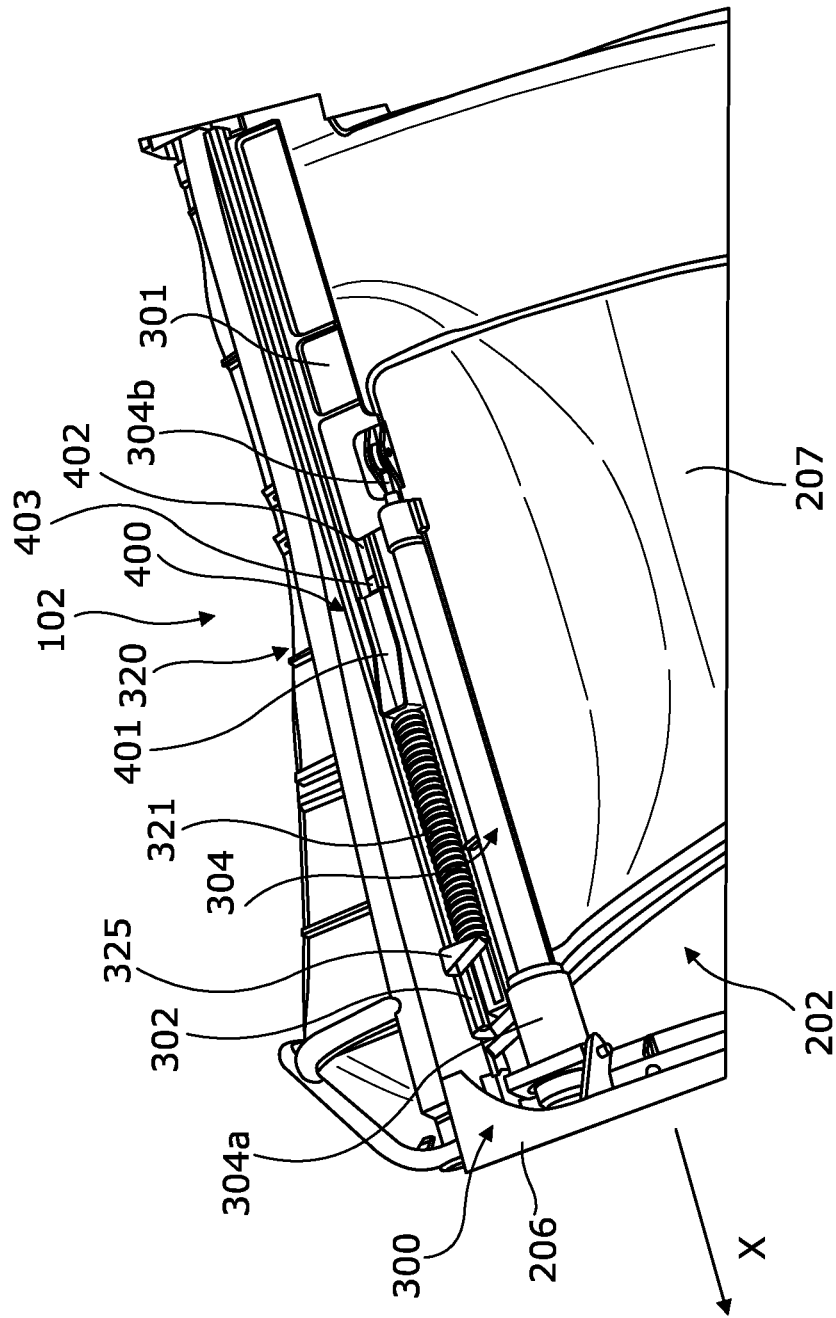

TURBOJET ENGINE NACELLE COMPRISING A THRUST REVERSER DRIVE MECHANISM

CROSS REFERENCE TO RELATED APPLICATION

This application claims priority to co-pending French Patent Application FR 17 51003, filed Feb. 7, 2017, the content of which is incorporated by reference herein in its entirety.

TECHNICAL FIELD

The present disclosure relates to a nacelle of a turbofan engine which comprises at least one thrust reverser and a drive mechanism of the reverser.

BACKGROUND

A nacelle comprises a thrust reverser made up of a movable cowl movably mounted translationally on the structure of the nacelle and at least one blocker door which is movably mounted rotationally on the structure of the nacelle and which is mechanically linked to the movable cowl.

The activation of the thrust reverser involves a displacement, at least via an actuator hinged to the movable cowl, of the movable cowl towards the rear of the nacelle to bring about a tilting of the blocker door until the blocker door partially closes the bypass flow path to expel a proportion of the bypass air flow towards the outside.

The aerodynamic pressures on the blocker door or the movable cowl are substantial and tend to displace the movable cowl towards the rear of the nacelle. The actuator or actuators allowing the activation/deactivation of the thrust reverser must be of such dimensions, consequently, as to exert sufficient tractive force on the movable cowl to oppose the substantial forces generated by the aerodynamic pressures, in particular during the deactivation of the reverser.

In an aircraft in which the available power is limited (hydraulic or electrical according to the actuator technology used), the substantial power requirements of large-sized actuators for the few seconds during which they operate to deactivate the thrust reverser are not fully met and the deactivation times of the thrust reverser are not therefore optimum.

There is a need to reduce the deactivation time of the thrust reverser.

SUMMARY

An object of the present disclosure is to respond to the aforementioned need.

To this end, a nacelle is proposed for a turbofan engine, the nacelle comprising:
- a fixed structure supporting a fixed cowl and a movable cowl, the movable cowl being movable translationally between a closing position in which the movable cowl is close to the fixed cowl and an opening position in which the movable cowl is remote from the fixed cowl;
- a through-opening delimited or defined upstream by the fixed cowl and downstream by the movable cowl in its opening position;
- a blocker door movably mounted rotationally about a rotational axis between a closed position in which the door closes the opening and an open position in which the door does not close the opening; and
- a drive mechanism of the blocker door and of the movable cowl between the closed/closing position and the open/opening position of the blocker door/movable cowl, respectively, and vice versa, the drive mechanism comprising at least one actuator fixed, on the one hand, to the fixed structure of the nacelle and, on the other hand, to a fitting fixed to the movable cowl, the drive mechanism moreover comprising, for each actuator, a flexible member having a first end fixed to the fixed structure of the nacelle and a second end fixed to the fitting.

BRIEF DESCRIPTION OF THE DRAWINGS

The characteristics of the disclosure herein referred to above, as well as others, will become clearer on reading the following description of an exemplary embodiment, the description referring to the attached, example figures, in which:

FIGS. 4A, 4B, 4C are similar views to FIG. 3 of the drive mechanism of the thrust reverser according to a second embodiment of the disclosure herein, during different stages of the displacement of the movable cowl from its closing position (FIG. 4A) to an engagement position (FIG. 4B) up to its opening position (FIG. 4C).

DETAILED DESCRIPTION

Figure 1:
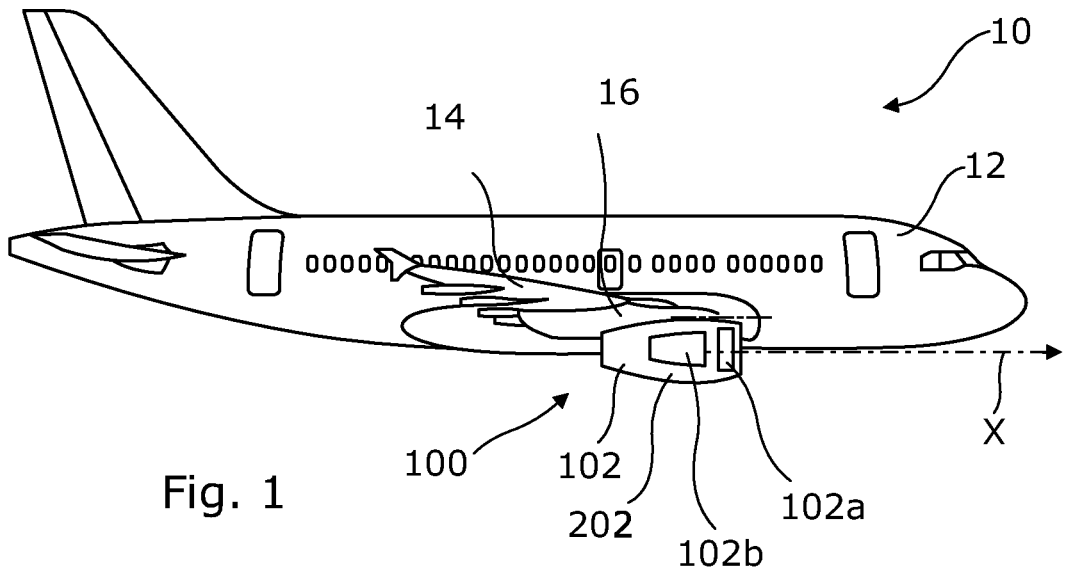
FIG. 1 is a side view of an aircraft comprising a nacelle according to the disclosure herein.

With reference to FIG. 1, an aircraft 10 comprises a fuselage 12, on each side of which a wing 14 is arranged, beneath which at least one turbofan engine 100 according to the disclosure herein is fixed via a pylon 16. The turbofan engine 100 comprises a nacelle 102 and, from the front to the back of the nacelle along the longitudinal axis X of the nacelle, a fan 102a and an engine 102b driving the fan 102a, both being housed inside the nacelle 102.

The turbofan engine 100 has a flow path 202 between the nacelle 102 and the engine 20. When the engine is running, a bypass air flow 208 (FIG. 2) expelled by the fan circulates in the flow path 202 before being expelled at the rear of the turbofan engine 100.

Figure 2:
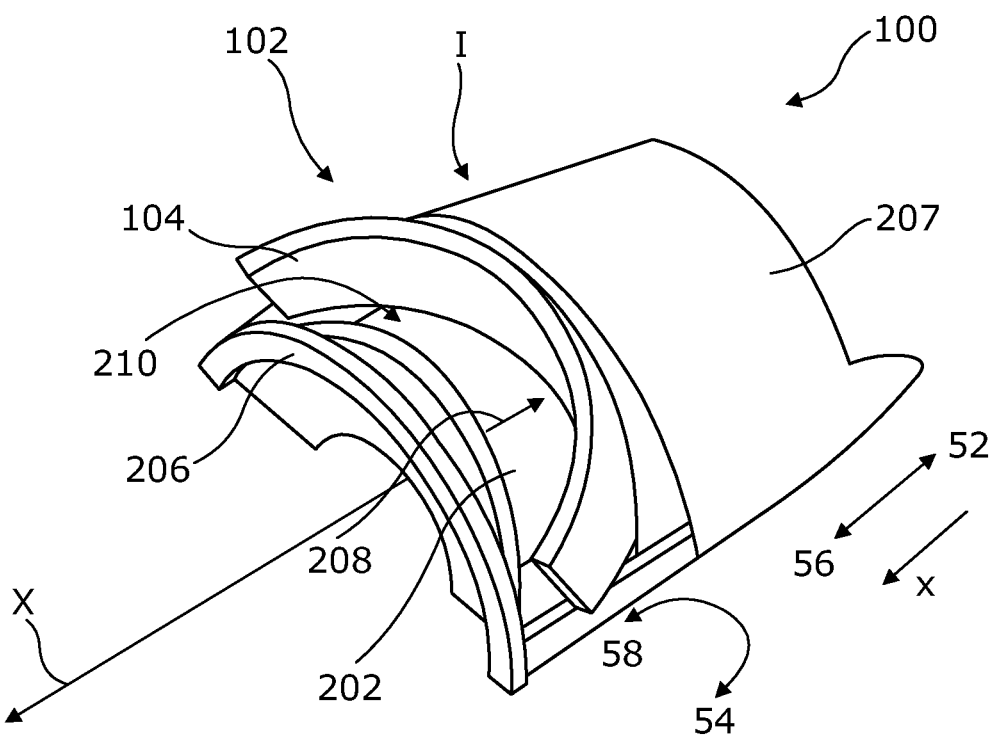
FIG. 2 is a perspective view of a section of the nacelle in FIG. 1 along a longitudinal axis of the nacelle, the nacelle comprising a thrust reverser and a drive mechanism of the thrust reverser, the reverser having a movable cowl that can be displaced between a closing and an opening position and a blocker door that can be displaced between an open position and a closed position.
Figure 3A:
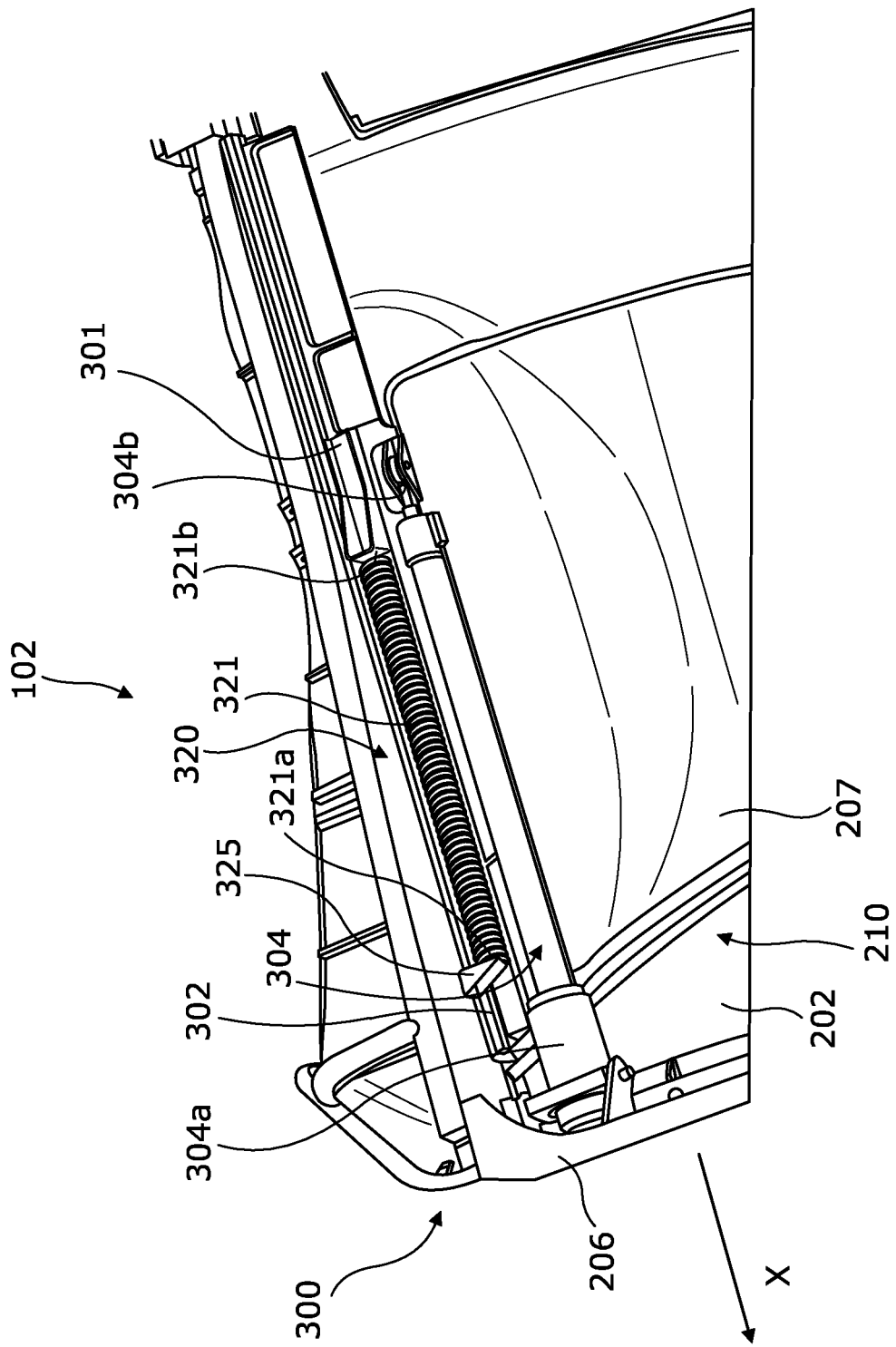
FIGS. 3A, 3B, are plan views of a section of the nacelle along a longitudinal axis of the nacelle and show a detail of the drive mechanism of the thrust reverser according to a first embodiment of the disclosure herein, during different displacement stages of the movable cowl from its closing position (FIG. 3A) to its opening position (FIG. 3B)
Figure 3B:
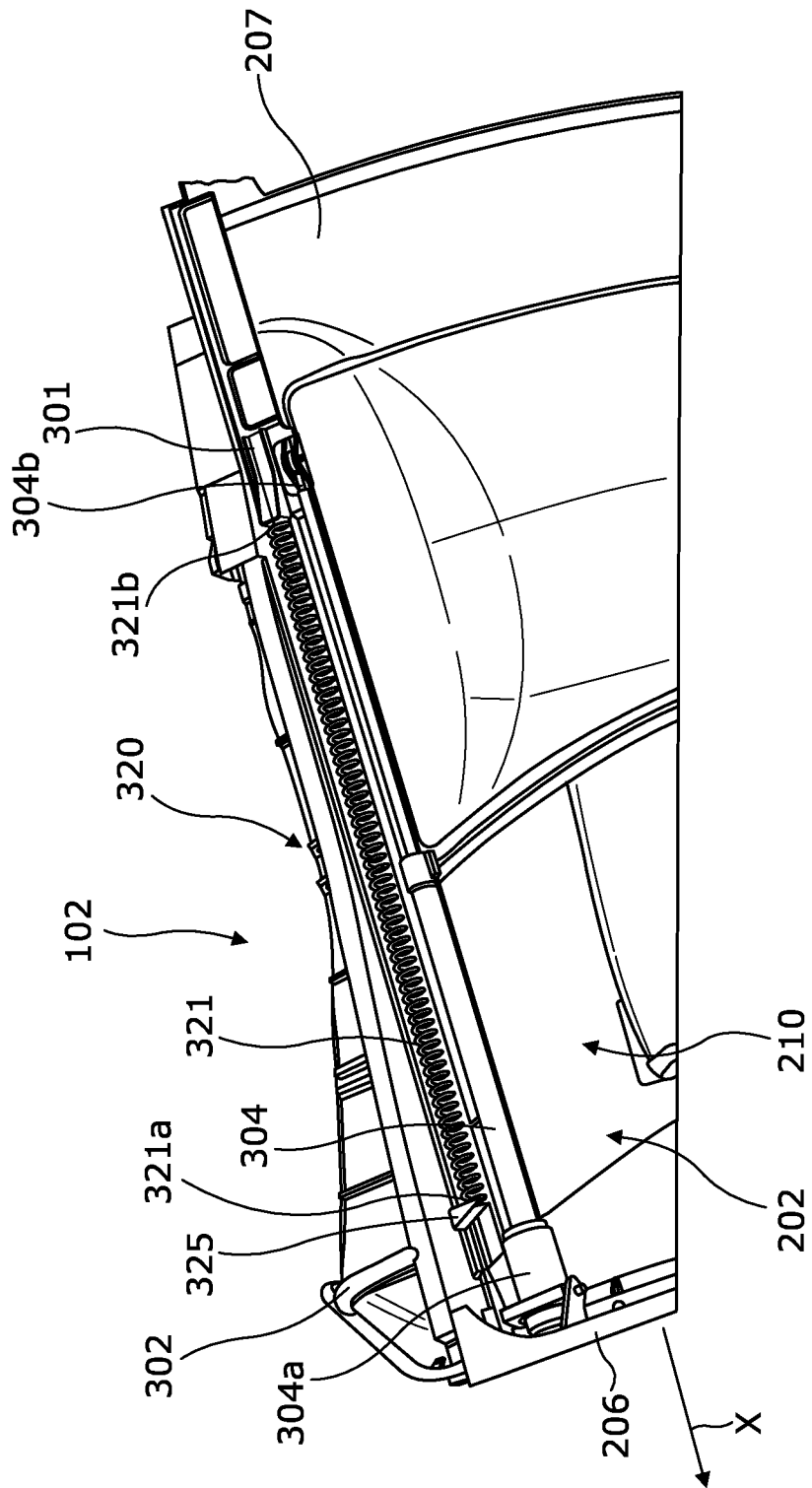

With reference to FIGS. 2 and 3A-B, the nacelle 102 comprises from front to rear along the longitudinal axis X of the nacelle, a fixed cowl 206 mounted in a fixed manner on the fixed structure of the nacelle 102, then at least one thrust reverser I that can be activated/deactivated exhibiting movable sections, in particular at least one blocker door 104 (only shown in FIG. 2) and a movable cowl 207.

The fixed cowl 206 and the movable cowl 207 exhibit an outer surface which constitutes the outer casing of the nacelle 102 and an inner surface which constitutes an outer wall of the flow path 202.

The nacelle 102 further exhibits, for each blocker door 104, a through-opening (or window) 210 through which the bypass flow path 202 and the outside of the nacelle 102 communicate.

The movable cowl 207 is movably mounted translationally in a translation direction globally parallel to the longitudinal axis X between a closing position in which it is close to the fixed cowl 206 and an opening position in which it is remote from the fixed cowl 206, in such a manner as to widen the opening 210. The translation is realized by and can comprise any appropriate structure such as, for example, guideways in which each guideway is formed by a fitting 301 (not shown in FIG. 2) fixed to the movable cowl 207 and sliding in a groove 302 (not shown in FIG. 2) arranged on the fixed structure of the nacelle 102.

The fixed cowl 206 delimits or defines the upstream opening 210 in respect of the longitudinal axis X, whereas the movable cowl 207, in the opening position, delimits or defines the downstream opening 210 in respect of the longitudinal axis X.

The blocker door 104 is movably mounted rotationally on the fixed structure of the nacelle 102 about a rotational axis which is substantially perpendicular to the longitudinal axis X of the nacelle 102. The blocker door 104 is movable between a closed position in which it closes the opening 210 and an open position in which it does not close the opening 210 and has a section extending through the flow path 202 to deflect at least a proportion of the bypass flow 208 towards the outside of the nacelle through the opening 210.

For example, as is illustrated in FIG. 2, the blocker door 104 has, in the open position, a section situated on the outside of the nacelle 102.

The blocker door 104 is mechanically linked to the movable cowl 207 in such a manner that the movement of the blocker door 104 between its closed position and its open position is coordinated with the movement of the movable cowl 207 between its closing position and its opening position, and vice versa.

This coordination is guaranteed by a drive mechanism 300 which, with reference to FIG. 3, comprises in a known manner:
- at least one mechanical link (not shown) between the blocker door 104 and the movable cowl 207, for example a rod mounted in a hinged manner between the blocker door 104 and the movable cowl 207,
- at least one actuator 304 (for example one on each side of the movable cowl) fixed, on the one hand, to a fixed structure of the nacelle 102 and, on the other, to the fitting 301 of the movable cowl,
- a control unit (not shown) of the processor type which drives the actuator(s) 304 to activate the thrust reverser I (moving from the closed/closing position into the open/opening position), and vice versa, to deactivate the thrust reverser I (moving from the open/opening position to the closed/closing position), according to the needs of the aircraft 10.

According to the disclosure herein, the drive mechanism 300 moreover comprises, for each actuator 304, a flexible member 320, subjected to compressive or tensile stress, arranged between the movable cowl 207 and the fixed structure of the nacelle 102 and having as its aim that of helping the actuator 304 to oppose the forces generated by the aerodynamic pressures exerted on the components of the thrust reverser I.

The flexible member 320 is fixed at a first end 321a to an integral anchoring point 325 of the fixed structure of the nacelle 102 and is fixed at a second end 321b to the fitting 301 of the movable cowl 207.

The flexible member 320 is a spring 321, for example. In the example shown in FIG. 3, the spring 321 is a spiral spring, the elongation axis whereof is disposed globally along an axis parallel to the longitudinal axis X of the nacelle 102. The anchoring point 325 is situated in front of the fitting 301 along the longitudinal axis X of the nacelle.

When the aircraft pilots wish to activate the thrust reverser I, the control unit manages each actuator to implement, from the closed position of the blocker door and the closing position of the movable cowl (FIG. 3A), a first combination ensuring:
- a translation towards the rear (arrow 52 in FIG. 2) of the movable cowl 207 which ensures the displacement of the movable cowl 207 from the closing position to the opening position, and
- through the action of the mechanical link between the door 104 and the movable cowl 207, a rotation (arrow 54 in FIG. 2) of the blocker door 104 about its rotational axis which ensures the displacement of the blocker door 104 from the closed position to the open position.

During this first combination, the force required of each actuator 304 to initiate the translational movement towards the rear of the movable cowl 207 is weak in respect of the capacity of the actuator 304 when the blocker door 104 and the movable cowl 207 are both subjected to a strong aerodynamic pressure which tends to displace them towards their open/opening position, respectively. In this case, each actuator 304 is, during this first combination, handled in such a manner as to control the activation speed of the thrust reverser (in other words, to slow down the displacement of the movable cowl 207, under the action of the aerodynamic pressure, in order to avoid damage to the thrust reverser). Each spring 321 associated with an actuator 304 extends during translation of the movable cowl 207 towards the rear and tends to exert a force which opposes proportionally the translational movement towards the rear of the movable cowl 207 and thereby comes to relieve the actuator 207 up to the stroke end (FIG. 3B) of the translation of the movable cowl 207 towards the rear.

Conversely, when aircraft pilots wish to deactivate the thrust reverser I, the control unit activates each actuator 304 to implement, from the open position of the blocker door 104 and the opening position of the movable cowl 207 (FIG. 3B), a second combination ensuring:
- a forward translation (arrow 56) of the movable cowl 207 in the translational direction which ensures the displacement of the movable cowl 207 from the opening position to the closing position, and
- through the action of the mechanical link between the blocker door 104 and the movable cowl 207, a rotation (arrow 58) in the converse direction of the blocker door 104 about its rotational axis which ensures the return of the blocker door 104 from the open position to the closed position.

During this second combination, each actuator 304 pulls the movable cowl 207 towards the front towards its closing position, with a resisting force over the translational path of the movable cowl 207. The force exerted by each actuator 304 must be sufficient to overcome the aerodynamic pressures acting on the components of the thrust reverser I.

During the translation of the movable cowl 207 towards the front, the spring 321, which has been stretched during the first combination, applies a force which tends to lead the movable cowl 207 towards the fixed cowl 206 (FIG. 3A).

The force which the actuator 304 must exert in order to lead the movable cowl 207 towards the fixed cowl 206 is therefore reduced by the value of the restoring force of the spring 321.

Thanks to the disclosure herein, the capacity of each actuator 304 can be reduced since the drive mechanism 300, particularly the flexible member 320, contributes a supplementary force aimed at balancing the use of a smaller-sized actuator. The actuator 304, being smaller in size, has, over the few seconds of its operation, lower power requirements. Thanks to the disclosure herein, it is therefore possible to find an actuator performing optimally, despite the limitations of the aircraft power available, in order to deactivate the thrust reverser with a shorter deactivation time.

Each actuator 304 is, for example, a hydraulic or pneumatic cylinder, the rod whereof forms the movable part 304$b$ hinged onto the fitting 301, and the cylinder whereof forms the body 304$a$ fixed to the fixed structure of the nacelle or also a screw/nut system (as a subcomponent of an electric cylinder), the nut or screw whereof, respectively, forms the movable part 304$b$ hinged to the fitting 301 and the screw or the nut, respectively, forms the body 304$a$ fixed to the fixed structure of the nacelle, by an electric motor or not.

By way of example, using a 5000 N loading spring which is subjected to tensile stress in a drive mechanism according to the disclosure herein, it is possible to reduce the cylinder dimensions by 15% (for cylinder values, without a drive mechanism according to the disclosure herein, with a 750 mm stroke and with an outer cylinder casing measuring 5 mm). Thanks to this reduction in size of the cylinder and for a maximum hydraulic fluid output of 35 l/min, the activation time of the thrust reverser changes from 2.5 to 1.1 seconds and the deactivation time changes from 7 to 2.4 seconds.

As an alternative (not shown), when the spring is subjected to compressive stress, the anchoring point to which a first end of the spring is fixed is situated behind the fitting of the movable cowl to which a second end of the spring is fixed. The displacement of the fitting of the movable cowl towards the anchoring point, when the movable cowl is displaced towards its opening position, compresses the spring.

In this case, during the first combination implemented by the control unit to activate the thrust reverser, each spring is compressed during the translation of the movable cowl and tends to exert a force which proportionally opposes the translational movement towards the rear of the movable cowl and relieves the cylinder up to the stroke end of its translation towards the rear.

During the second combination implemented by the control unit in order to deactivate the thrust reverser, the compressed spring applies a force which tends to lead the movable cowl towards the fixed cowl. The force of the cylinder required to lead the movable cowl towards the fixed cowl is therefore reduced by the value of the force exerted by the spring.

In the embodiments described above, the flexible member 320 is engaged from activation of the actuator 304 by the control unit.

In another embodiment of the disclosure herein, the drive mechanism 300 comprises a delay mechanism 400 associated with the movable cowl 207 and the flexible member 320, so that in a predetermined position of the movable cowl 207, termed an engagement position, during the translation from the closing position to the opening position of the movable cowl, the flexible member 320 is engaged/meshed with the movable cowl 207.

Advantageously, the predetermined position is defined in such a manner that the flexible member 320 starts to be stretched/compressed by a stroke of the movable cowl 207 close to 80% or else 90% of its maximum stroke towards the rear, in other words when the forces required of the actuator 304 in order to brake the translation of the movable cowl 207 are at a maximum. The delay mechanism thereby allows a flexible member 320 to be used with a smaller stroke characteristic and an increased load.

Figure 4B:
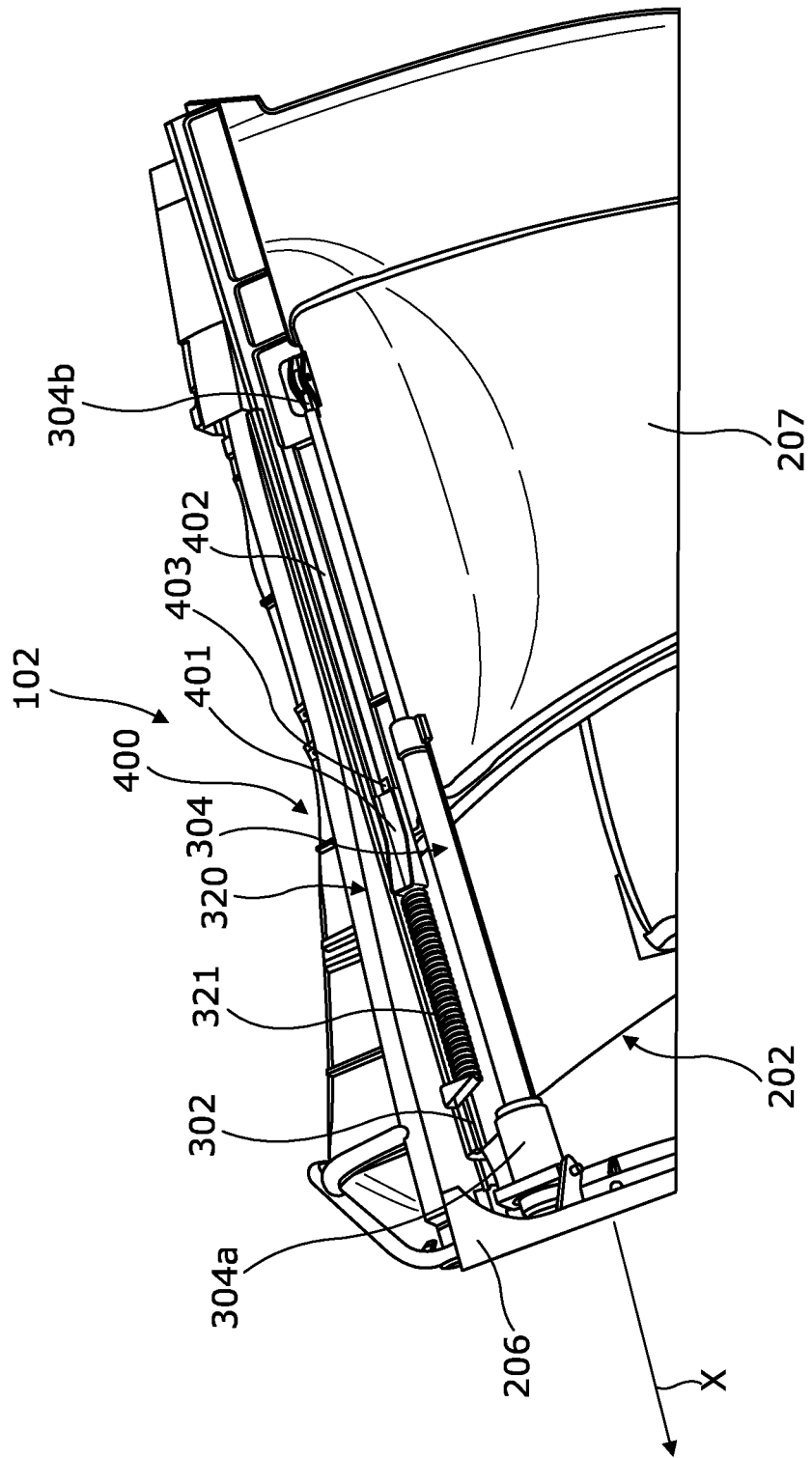
Figure 4C:
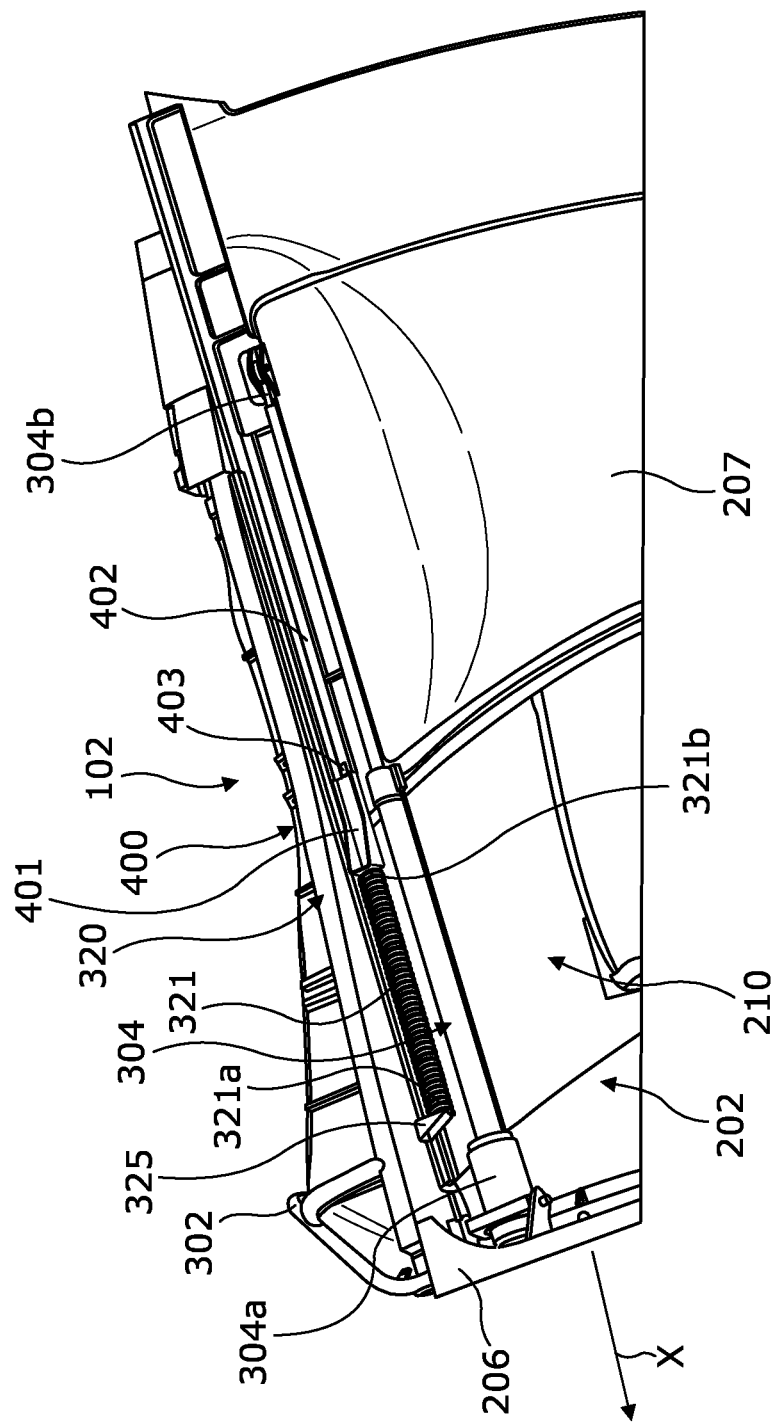

In an exemplary embodiment illustrated in FIGS. 4A-C in which the flexible member 320 is a spring 321 subjected to tensile stress, the delay mechanism 400 comprises a free fitting 401 movably mounted translationally in the fitting 301 of the movable cowl, and an abutment 403 arranged on the fitting 301 of the movable cowl and provided to drive the free fitting 401 with the fitting 301 of the movable fitting (and thereby to stretch the spring 321) when the movable cowl 207 crosses the engagement position during its displacement towards the rear of the nacelle 102.

The spring 321 is fixed at a first end 321$a$ to an anchoring point 325 integral with the fixed structure of the nacelle 102 and at a second end 321$b$ to the free fitting 401.

The fitting is guided in a rail 402 arranged on the fitting 301 and extending along an axis parallel to the longitudinal axis X of the nacelle and the abutment 403 is arranged at the upstream end of the rail 402. The spring 321 is fixed at a first end 321$a$ to an anchoring point 325 integral with the fixed structure of the nacelle 102 and at a second end 321$b$ to the free fitting 401. The anchoring point 325 is situated upstream of the free fitting 401 along the longitudinal axis X of the nacelle.

During the first combination implemented by the control unit to activate the thrust reverser I, the fitting 301 of the movable cowl 207 translates towards the rear of the nacelle, guided in the groove 302. The free fitting 401, held by the spring 321, remains immovable until the movable cowl 207 crosses the engagement position (FIG. 4B), beyond which the free fitting 401, held by the spring 321, rests against the abutment 403.

Beyond the engagement position, the displacement of the fitting 301 of the movable cowl 207 drives, via the abutment 403, the displacement of the free fitting 401 towards the rear and the tensioning of the spring 321 which then exerts a restoring force opposing the translational movement towards the rear of the movable cowl 207. The restoring force relieves the actuator 304 up to the stroke end (FIG. 4C) of the translation of the movable cowl 207 towards the rear.

During the second combination implemented by the control unit to deactivate the thrust reverser I, the actuator 304 draws (FIG. 4C) the movable cowl 207 towards the front towards its closing position and the stretched spring 321 exerts a restoring force on the movable cowl 207, via the free fitting 401 resting against the abutment 403, driving the displacement towards the front of the fitting 301 of the movable cowl. The force exerted by the spring 321 relieves the actuator 304 up to the moment at which the movable cowl 207 crosses the engagement position (FIG. 4B) at which the spring 321 reaches its rest position and no longer exerts any force on the free fitting 401. The free fitting 401 is then immobilized in relation to the fitting 301 of the movable cowl which continues to translate towards the front until the movable cowl 207 reaches its opening position. From the maximum elongation position of the spring to the engagement position, in other words when the forces required of the actuator 304 to draw the movable cowl 207 towards the front are at a maximum, the force required of the actuator 304 to guide the movable cowl 207 towards the fixed cowl 206 is therefore reduced by the value of the restoring force of the spring 321.

In the following description, the disclosure herein is more particularly described for a blocker door 104, but it applies in the same manner to each blocker door 104 when there are several of them. In particular, there may be two blocker doors 104 disposed one opposite the other, or four blocker doors 104 evenly spaced over the periphery of the nacelle 102.

Moreover, the disclosure herein has been described for a blocker door 104 provided to project in part towards the outside of the nacelle 102 in the event that the thrust reverser I should be activated and with a blocker door 104, whereof the outer surface of the door is an aerodynamic continuation of the outer surface of the fixed cowl 206 and of the cowl 207 when the blocker door is in the closed position.

The disclosure herein could, however, apply to any type of thrust reverser architecture, notably of the concealed blocker door type (also referred to as the door type) (in other words housed in the movable cowl 207 when the thrust reverser I is deactivated) or of the twin blocker door type (also referred to as double-door).

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle for a turbofan engine, the nacelle comprising:
   a fixed structure supporting a fixed cowl and a movable cowl, the movable cowl being movable translationally between a closing position in which the movable cowl is close to the fixed cowl and an opening position in which the movable cowl is remote from the fixed cowl;
   a through-opening defined upstream by the fixed cowl and downstream by the movable cowl in its opening position;
   a blocker door movably mounted rotationally on the fixed structure of the nacelle about a rotational axis between a closed position in which the blocker door closes the through-opening and an open position in which the blocker door does not close the opening; and
   a drive mechanism of the blocker door and of the movable cowl between the closed/closing position and the open/opening position of the blocker door and the movable cowl, respectively, and vice versa, the drive mechanism comprising at least one actuator fixed to the fixed structure of the nacelle and to a fitting fixed to the movable cowl,
   the drive mechanism comprising, for each of the at least one actuator, a spring having a first end fixed to the fixed structure of the nacelle and a second end fixed to the fitting, the spring being configured to exert a force that biases the movable cowl towards the closing position.

2. The nacelle according to claim 1, wherein the drive mechanism further comprises a delay mechanism associated with the movable cowl and the spring, so that in a predetermined position of the movable cowl, termed an engagement position, during translation from the closing position to the opening position of the movable cowl, the spring is engaged with the movable cowl.

3. The nacelle according to claim 2, wherein the delay mechanism comprises a free fitting movably mounted translationally in the fitting of the movable cowl, and an abutment arranged on the fitting of the movable cowl.

4. The nacelle according to claim 3, wherein the free fitting is movably mounted translationally in the fitting of the movable cowl by a rail extending along an axis parallel to a longitudinal axis of the nacelle and wherein the abutment is arranged at one end of the rail.

5. The nacelle according to claim 1, wherein the spring is subjected to tensile stress.

6. The nacelle according to claim 1, wherein the spring has an elongation axis disposed in parallel to a longitudinal axis of the nacelle.

7. The nacelle according to claim 1, wherein each actuator comprises a hydraulic or pneumatic cylinder or a screw/nut system.

* * * * *